US008315725B2

(12) United States Patent
Tomono et al.

(10) Patent No.: US 8,315,725 B2
(45) Date of Patent: Nov. 20, 2012

(54) METHOD AND APPARATUS FOR CONTROLLING CONTENT REPRODUCTION, AND COMPUTER PRODUCT

(75) Inventors: Mizuki Tomono, Tokyo (JP); Takashi Matsumura, Tokyo (JP); Koji Nakane, Tokyo (JP); Yoshinori Nakatsuka, Tokyo (JP)

(73) Assignee: Pioneer Corporation, Tokyo (JP)

( * ) Notice: Subject to any disclaimer, the term of this patent is extended or adjusted under 35 U.S.C. 154(b) by 1168 days.

(21) Appl. No.: 11/812,930

(22) Filed: Jun. 22, 2007

(65) Prior Publication Data

US 2008/0008331 A1 Jan. 10, 2008

(30) Foreign Application Priority Data

Jul. 6, 2006 (JP) ................................ 2006-187012

(51) Int. Cl.
*G06F 17/00* (2006.01)

(52) U.S. Cl. ........................................................ 700/94

(58) Field of Classification Search .................... 700/94; 710/303, 304

See application file for complete search history.

(56) References Cited

U.S. PATENT DOCUMENTS 7,110,755 B2 9/2006 Shibasaki et al.
7,523,289 B2 * 4/2009 Starr et al. .................... 711/202
2001/0028717 A1 10/2001 Ohmura et al.
2001/0048749 A1 12/2001 Ohmura et al.
2003/0086699 A1 * 5/2003 Benyamin et al. .............. 386/96
2004/0247280 A1 12/2004 Izawa
2005/0239434 A1 * 10/2005 Marlowe ....................... 455/345
2006/0169126 A1 * 8/2006 Ishiwata et al. ................. 84/615
2006/0248252 A1 * 11/2006 Kharwa ........................ 710/303
2007/0015486 A1 * 1/2007 Marlowe ....................... 455/345
2007/0101039 A1 * 5/2007 Rutledge et al. .............. 710/303
2008/0126661 A1 * 5/2008 Lin et al. ....................... 710/304

FOREIGN PATENT DOCUMENTS

JP 2001-296875 A 10/2001
JP 2001-297527 A 10/2001
JP 2003-50589 A 2/2003
JP 2003-196919 A 7/2003
JP 2004-234794 A 8/2004
JP 2006-129403 A 5/2006
JP 2006-287379 A 10/2006

* cited by examiner

*Primary Examiner* — Andrew C Flanders
(74) *Attorney, Agent, or Firm* — Foley & Lardner LLP

(57) ABSTRACT

Appropriate content is determined from among multiple content items, and is reproduced. Content reproduction terminal devices having the content items recorded therein are connected with a content reproduction controlling apparatus. An acquiring unit acquires content information from each content reproduction terminal device, information indicative of the subject matter of the content items. A determining unit determines the content items to be reproduced, i.e., reproduction content based on the acquired content information. An extracting unit extracts the reproduction content from the content reproduction terminal device that has the reproduction content recorded therein. A reproducing unit reproduces and outputs the extracted reproduction content.

27 Claims, 10 Drawing Sheets

FIG.7

700

| TRACK (701) | TITLE OF SONG (702) | ARTIST NAME (703) | CATEGORY (704) | RELEASE YEAR (705) | LISTENING FREQUENCY (706) | VERSION INFORMATION (707) |
|---|---|---|---|---|---|---|
| 0001 | A-1 | B-1 | ROCK | 2006 | 25 TIMES | REGULAR |
| 0002 | A-2 | B-2 | POP | 2006 | 18 TIMES | REGULAR |
| 0003 | A-1 | B-1 | ROCK | 2006 | 7 TIMES | LIVE |
| 0004 | A-3 | B-3 | ROCK | 1988 | 52 TIMES | REGULAR |
| 0005 | A-4 | B-4 | JAZZ | 1978 | 9 TIMES | LIVE |
| 0006 | A-2 | B-5 | POP | 1982 | 5 TIMES | REGULAR |
| . . | . . | . . | . . | . . | . . | . . |

METHOD AND APPARATUS FOR CONTROLLING CONTENT REPRODUCTION, AND COMPUTER PRODUCT

BACKGROUND OF THE INVENTION

1. Field of the Invention

The present invention relates to a content data reproduction system.

2. Description of the Related Art

A content data multi-reproduction system that can simultaneously read a variety of content data from a source device, and individually and concurrently provide the content data to multiple users is conventionally known. Such multi-reproduction systems include an in-vehicle audio system that can reproduce different content data and multiple portable reproducing devices that are within a predetermined range, such as the vehicle interior of a car in the case of an in-vehicle audio system. The in-vehicle audio system acquires different content data from multiple source devices provided in the in-vehicle audio system, and simultaneously transmits the content data to the portable reproducing devices through wireless communication. The portable reproducing devices receive the content data transmitted from this in-vehicle audio system, and reproduce the data in each reproducing unit (for an example, Japanese Patent Application Laid-Open No. 2003-196919).

However, according to the conventional technology, although users can view, listen to, or view and listen to content according to individual preference, this technology has a problem in which, for example, users cannot view, listen to, or view and listen to common content. In general, users who travel in the same vehicle to the same destination can be considered to be traveling to the destination for the same purpose. In this case, viewing, listening to, or viewing and listening to the same content in the vehicle may be preferable to facilitate communication in the vehicle or after arriving at the destination.

On the other hand, when users view, listen to, or view and listen to the same content, a problem arises in which, for example, the selection of content suiting the preference of each user is difficult. For example, when content is selected, the preference of the user selecting the content is likely to be reflected, thereby forcing the preference of this user on other users. Further, there may be a case in which, disliking such a situation, no user initiates selection of content.

SUMMARY OF THE INVENTION

It is an object of the present invention to at least solve the above problems in the conventional technologies.

A content reproduction controlling apparatus according to one aspect of the present invention is connected with a plurality of content reproduction terminal devices, each having a plurality of content items recorded therein; and the content reproduction controlling apparatus includes an acquiring unit that acquires, from each of the content reproduction terminal devices, content information indicative of a subject matter of each of the content items; a determining unit that determines a reproduction content based on the content information, the reproduction content being at least one of the content items to be reproduced; an extracting unit that extracts the reproduction content from the content reproduction terminal devices respectively having the reproduction content recorded therein; and a reproducing unit that reproduces and outputs the extracted reproduction content.

A content reproduction controlling apparatus according to another aspect of the present invention is connected with a plurality of content reproduction terminal devices, each having a plurality of content items recorded therein; and the content reproduction controlling apparatus includes an acquiring unit that acquires, from each of the content reproduction terminal devices, content information indicative of a subject matter of each of the content items; a determining unit that determines a reproduction content based on the content information, the reproduction content being at least one of the content items to be reproduced; a reproduction-command transmitting unit that transmits, to the content reproduction terminal devices respectively having the reproduction content recorded therein, a command to reproduce the reproduction content; a reproduction-data receiving unit that receives reproduction data, the reproduction data being the reproduced reproduction content; and a reproduction-data output unit that outputs the received reproduction data.

A content reproduction controlling method, according to yet another aspect of the present invention, is for an apparatus connected with a plurality of content reproduction terminal devices, each having a plurality of content items recorded therein; and the content reproduction controlling method includes acquiring, from each of the content reproduction terminal devices, content information indicative of a subject matter of each of the content items; determining a reproduction content based on the content information, the reproduction content being at least one of the content items to be reproduced; extracting the reproduction content from the content reproduction terminal devices respectively having the reproduction content recorded therein; reproducing the extracted reproduction content; and outputting the extracted reproduction content.

A content reproduction controlling method, according to still another aspect of the present invention is for an apparatus connected with a plurality of content reproduction terminal devices, each having a plurality of content items recorded therein; and the content reproduction controlling method includes acquiring, from each of the content reproduction terminal devices, content information indicative of a subject matter of each of the content items; determining a reproduction content based on the content information, the reproduction content being at least one of the content items to be reproduced; transmitting a reproduction-command to the content reproduction terminal devices respectively having the reproduction content recorded therein to reproduce the reproduction content; receiving reproduction data, the reproduction data being the reproduced reproduction content; and outputting the received reproduction data.

A computer-readable recording medium according to yet another aspect of the present invention stores therein a content reproduction controlling program for an apparatus connected with a plurality of content reproduction terminal devices, each having a plurality of content items recorded therein; and the content reproduction controlling program causes a computer to execute the above mentioned content reproduction controlling methods.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a table of content information acquired by the content reproduction controlling apparatus;

DETAILED DESCRIPTION OF THE PREFERRED EMBODIMENTS

Referring to the accompanying drawings, exemplary embodiments according to the present invention are explained in detail below.

Figure 1:
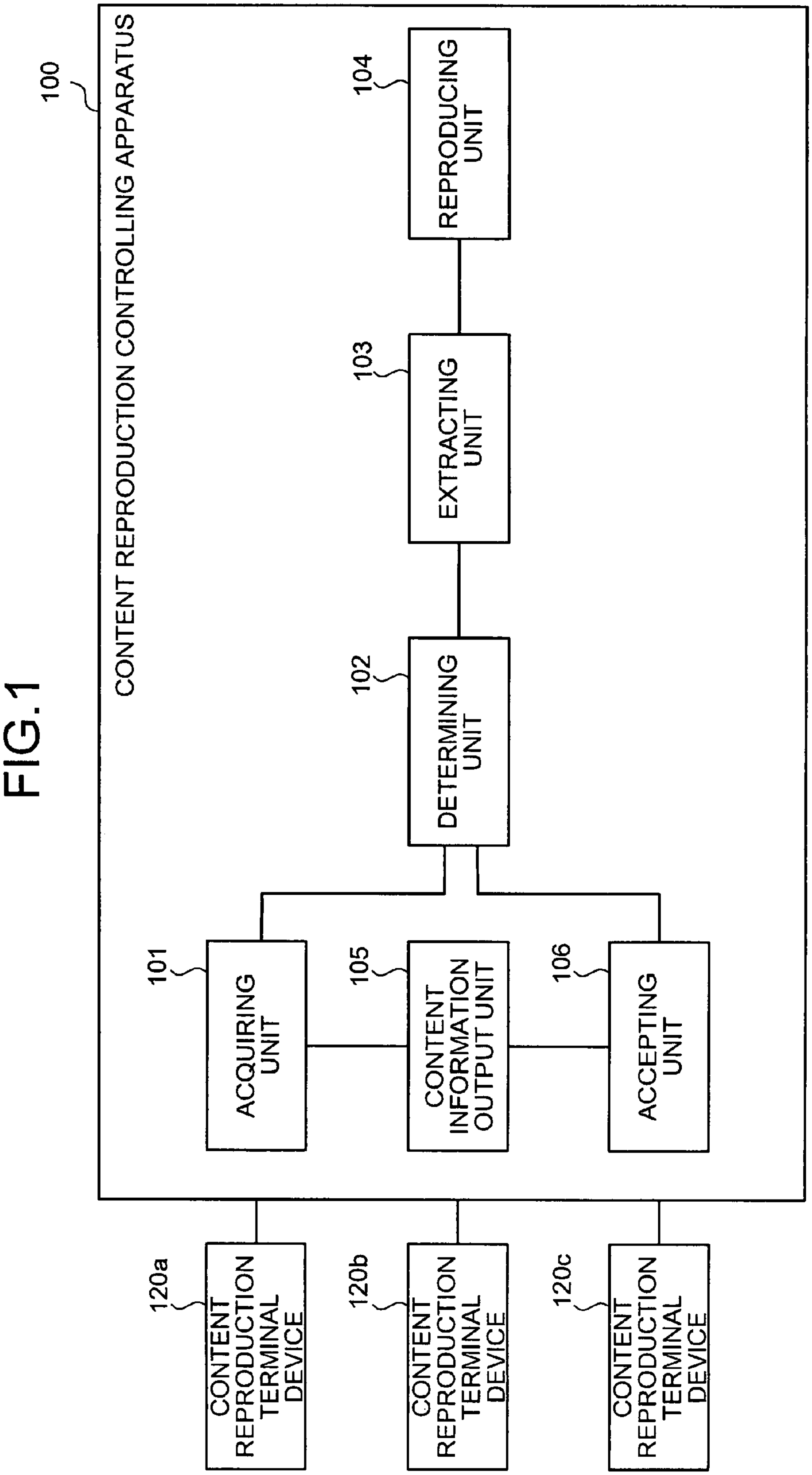
FIG. 1 is a block diagram of a content reproduction controlling apparatus.

FIG. 1 is a block diagram of a content reproduction controlling apparatus 100 according to an embodiment of the present invention. The content reproduction controlling apparatus 100 includes an acquiring unit 101, a determining unit 102, an extracting unit 103, a reproducing unit 104, a content information output unit 105, and an accepting unit 106. Content reproduction terminal devices 120 (120*a* to 120*c*) having multiple content recorded therein are connected to the content reproduction controlling apparatus 100. The content reproduction controlling apparatus 100 may be connected to each content reproduction terminal device 120 by a cable.

The acquiring unit 101 acquires information indicative of content details (hereinafter, "content information") from each content reproduction terminal device 120. The content information is, for example, information concerning the name of the content, a category of the content, a performer in the content, or the number of times of the content in each content reproduction terminal device 120 has been reproduced.

The determining unit 102 determines the content to be reproduced (hereinafter, "reproduction content") based on the content information acquired by the acquiring unit 101. The determining unit 102 determines the content to be reproduced based on, for example, information that is common among the content information. Specifically, for example, when content having information concerning a common content name is recorded in multiple content reproduction terminal devices 120, the determining unit 102 determines the content having this name as the reproduction content.

For example, when content having information concerning a common category of the content is recorded in multiple content reproduction terminal devices 120, the determining unit 102 determines content belonging to this category as the reproduction content. For example, when content having common information concerning a performer in the content is recorded in multiple content reproduction terminal devices 120, the determining unit 102 determines the content concerning the performer as the reproduction content.

The content reproduction terminal devices 120 having common information can be all the content reproduction terminal devices 120 connected with the content reproduction controlling apparatus 100, or can be some of the content reproduction terminal devices 120 connected to the content reproduction controlling apparatus. For example, the reproduction content can be determined based on the number of the content reproduction terminal devices 120 having the content recorded therein.

The determining unit 102 may determine content to be reproduced based on information concerning the number of times of each content in each content reproduction terminal device 120 has been reproduced. Specifically, the determining unit 102 determines, as the reproduction content, content that has been reproduced in each content reproduction terminal device 120 at least a predetermined number of times.

The determining unit 102 may determine content that is accepted by the accepting unit 106, described hereinafter, to be the reproduction content. The number of reproduction contents determined by the determining unit 102 may be one or more. When more than one content is determined as the reproduction content, the determining unit 102 may determine a reproduction order of the reproduction content, hereinafter described.

The extracting unit 103 extracts the reproduction content determined by the determining unit 102 from the content reproduction terminal device 120 having the reproduction contents recorded therein. The extracting unit 103 transmits, to the content reproduction terminal device 120, a command for transmission of the content data of the reproduction content, and receives the reproduction content transmitted in response to the transmission command, thereby extracting the reproduction content.

The reproducing unit 104 reproduces and outputs the reproduction content extracted by the extracting unit 103. The reproducing unit 104 converts the reproduction content extracted from the content reproduction terminal device 120 into, for example, audio data or image data, and outputs sound or an image.

The content information output unit 105 outputs the content information acquired by the acquiring unit 101 to at least one of the content reproduction terminal devices 120. The content information output by the content information output unit 105 may be all or a part of the content information acquired by the acquiring unit 101.

The accepting unit 106 accepts specification of the content from the content reproduction terminal device 120 that receives the content information output from the content information output unit 105. The specification of content may be executed with respect to multiple content. When the accepting unit 106 accepts the specification of the content, the determining unit 102 determines the content accepted by the accepting unit 106 as the reproduction content.

The content reproduction controlling apparatus 100 may use the determining unit 102 to determine a reproduction order of content. In this case, the determining unit 102 determines the reproduction order of the content based on the content information acquired by the acquiring unit 101. The determining unit 102 may determine the reproduction order together with the reproduction content, or may determine the reproduction order of content alone.

When the determining unit 102 determines the reproduction order, the extracting unit 103 sequentially extracts the content determined by the determining unit 102 from the content reproduction terminal device 120. Sequential extraction means extraction of content based on the reproduction order of content determined by the determining unit 102. The reproducing unit 104 sequentially reproduces and outputs the content extracted by the extracting unit 103.

Figure 2:
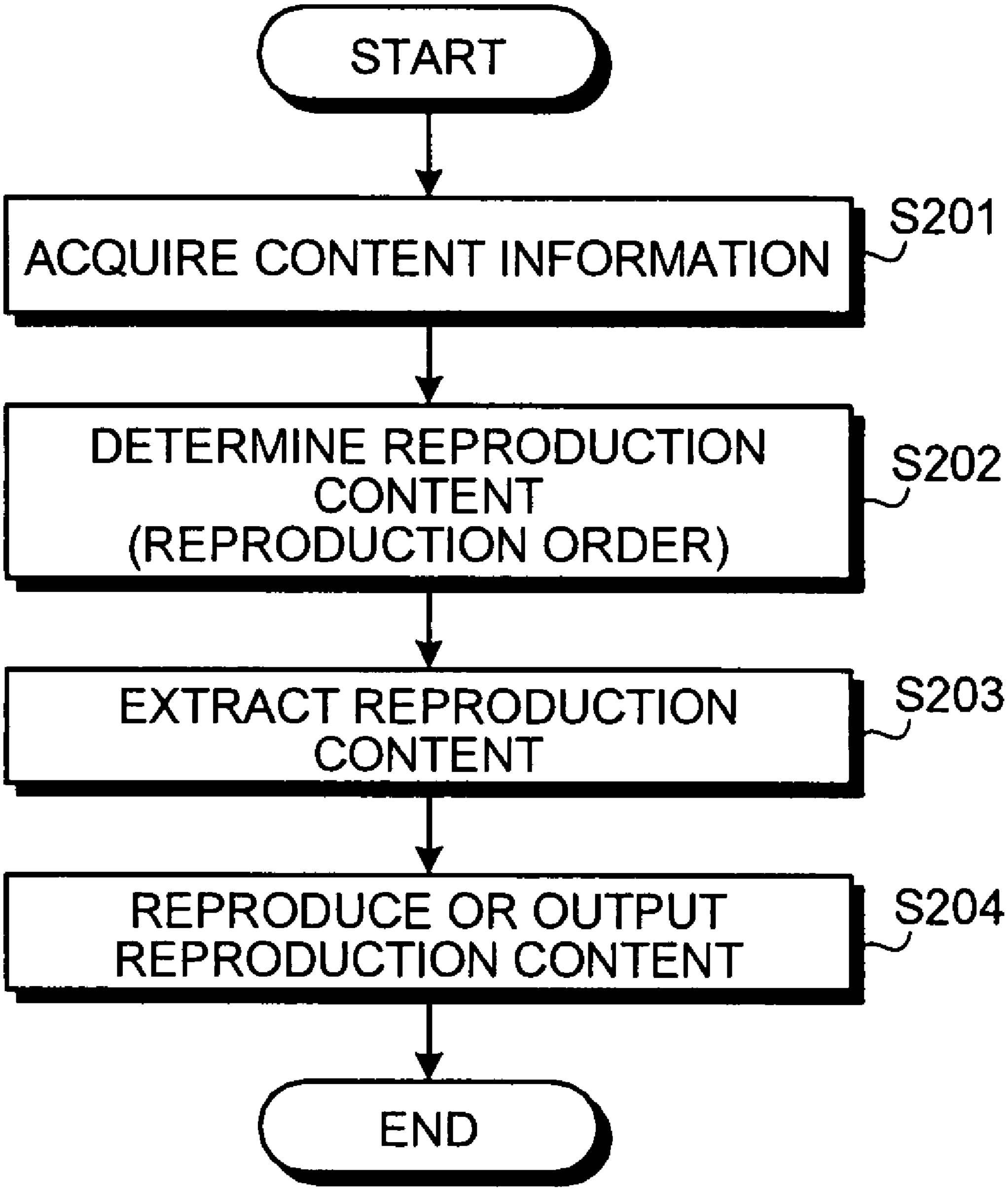
FIG. 2 is a flowchart of content reproduction control processing executed by the content reproduction controlling apparatus.

FIG. 2 is a flowchart of the content reproduction control process executed by the content reproduction controlling apparatus. As shown in FIG. 2, the content reproduction controlling apparatus 100 uses the acquiring unit 101 to acquire content information from each content reproduction terminal device 120 (step S201).

Then, the content reproduction controlling apparatus 100 uses the determining unit 102 to determine reproduction content (step S202). The determining unit 102 determines the reproduction content based on information that is common among the content information or determines the content accepted by the accepting unit 106 as the reproduction content. The determining unit 102 may also determine a reproduction order of content together with the reproduction content or in place of the reproduction content.

Subsequently, the content reproduction controlling apparatus 100 uses the extracting unit 103 to extract the reproduction content from the content reproduction terminal device 120 (step S203). At this time, if the reproduction order of content is determined, the content is sequentially extracted based on the reproduction order.

Then, the content reproduction controlling apparatus 100 uses the reproducing unit 104 to reproduce and output the reproduction content (step S204), and terminates the processing shown in this flowchart. At this moment, if the reproduction sequence of content is determined, the content is sequentially reproduced and output based on the reproduction sequence.

According to the above description, the content reproduction controlling apparatus reproduces the reproduction content, however, the content reproduction terminal device 120 may perform reproduction. In this case, the content reproduction controlling apparatus outputs the reproduction data reproduced by the content reproduction terminal device 120. The content reproduction controlling apparatus having such a configuration will be referred to as a content reproduction controlling apparatus 300 hereinafter.

Figure 3:
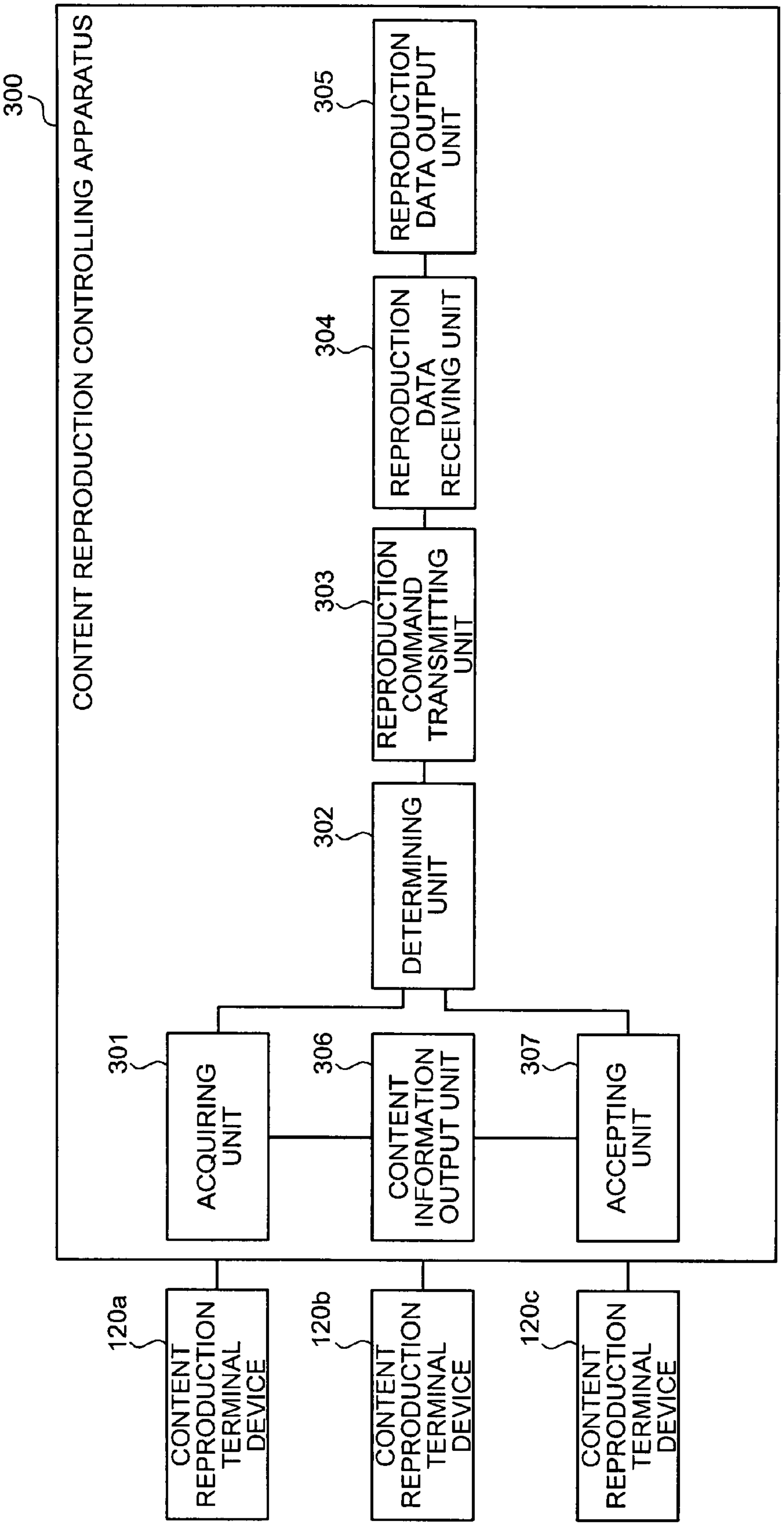
FIG. 3 is block diagram of another content reproduction controlling apparatus.

FIG. 3 is a block diagram of another content reproduction controlling apparatus. The content reproduction controlling apparatus 300 includes an acquiring unit 301, a determining unit 302, a reproduction command transmitting unit 303, a reproduction data receiving unit 304, a reproduction data output unit 305, a content information output unit 306, and an accepting unit 307. Content reproduction terminal devices 120 (120*a* to 120*c*) having a variety of content recorded therein are connected to the content reproduction controlling apparatus 300.

Connection between the content reproduction controlling apparatus 300 and each content reproduction terminal device 120 is the same as that of the content reproduction controlling apparatus 100 depicted in FIG. 1. The acquiring unit 301, the determining unit 302, the content information output unit 306, and the accepting unit 307 constituting the content reproduction controlling apparatus 300 are the same as the acquiring unit 101, the determining unit 102, the content information output unit 105, and the accepting unit 106, respectively, in the content reproduction controlling apparatus 100 depicted in FIG. 1, therefore description thereof is omitted.

The content reproduction controlling apparatus 300 determines reproduction content based on the same procedure as that of the content reproduction controlling apparatus 100. The reproduction command transmitting unit 303 in the content reproduction controlling apparatus 300 transmits, to the content reproduction terminal device 120 having the reproduction content recorded therein, a command of reproducing the reproduction content determined by the determining unit 302. The reproduction command for reproduction content is, for example, a control signal that controls the content reproduction terminal device 120 to reproduce the reproduction content.

The reproduction data receiving unit 304 receives the reproduction data that is reproduced based on the reproduction command transmitted by the reproduction command transmitting unit 303. The reproduction data received by the reproduction data receiving unit 304 is data obtained by reproducing the reproduction content by the content reproduction terminal device 120 based on the reproduction command from the content reproduction controlling apparatus 300.

The reproduction data output unit 305 outputs the reproduction data received by the reproduction data receiving unit 304. The reproduction data output unit 305 outputs the reproduction data in the form of an audio output or an image output according to the type of the reproduction content.

The content reproduction controlling apparatus 300 may also use the determining unit 302 to determine an order of content reproduction like the content reproduction controlling apparatus 100 depicted in FIG. 1. In this case, the determining unit 302 determines the reproduction order of content based on the content information acquired by the acquiring unit 301. The reproduction command transmitting unit 303 sequentially transmits, to the content reproduction terminal device 120 having the content stored therein, a command for reproduction of the content determined by the determining unit 302. The reproduction data receiving unit 304 sequentially receives the reproduction data reproduced based on the reproduction command transmitted by the reproduction command transmitting unit 303. The reproduction data output unit 305 sequentially outputs the reproduction data received by the reproduction data receiving unit 304.

As explained above, according to the content reproduction controlling apparatus 100 and 300, the reproduction content determined based on the content information acquired from the content reproduction terminal device 120 is reproduced, while the content reproduction controlling apparatus 300 outputs the reproduction content. As a result, appropriate content can be selected from multiple content recorded in the content reproduction terminal devices 120, reproduced, or output.

Specifically, the content reproduction controlling apparatus 100 and 300 determine reproduction content based on information common among the content information. As a result, content having an element common among the respective content reproduction terminal devices 120 can be reproduced, and content close to a preference of a user of each content reproduction terminal device 120 can be reproduced or output.

For example, when information common among content information is information concerning a name of the content, common content recorded in the respective content reproduction terminal devices 120 can be reproduced or output. For example, when information common among content information is information concerning a category of the content, common content belonging to the category recorded in the respective content reproduction terminal devices 120 can be reproduced or output. When information common among content information is information concerning a performer in the content, common content pertaining to the performer recorded in the respective content reproduction terminal devices 120 can be reproduced or output.

The content reproduction controlling apparatus 100 and 300 determine content to be reproduced based on information concerning the number of times each content in each content reproduction terminal device 120 has been reproduced. As a result, content suiting a preference of a user of each content reproduction terminal device 120, i.e., a favorite content of a user can be reproduced or output.

The content reproduction controlling apparatus 100 and 300 output content information to at least one of the content reproduction terminal devices 120, and accept specification of content from the content reproduction terminal device 120. As a result, each content reproduction terminal device 120 can specify content recorded in the other content reproduction terminal devices 120 to be reproduced or output.

The content reproduction controlling apparatus 100 and 300 respectively reproduce or output content in a reproduction order determined based on content information acquired from each content reproduction terminal device 120. As a result, content can be reproduced or output in an appropriate reproduction order from a variety of content recorded in the content reproduction terminal devices 120.

An example in which the content reproduction controlling apparatus 100 according to the above embodiment, is applied to a content reproduction controlling apparatus 400 installed in a vehicle is described.

(Structure of Peripheral Devices of Content Reproduction Controlling Apparatus 400)

Figure 4:
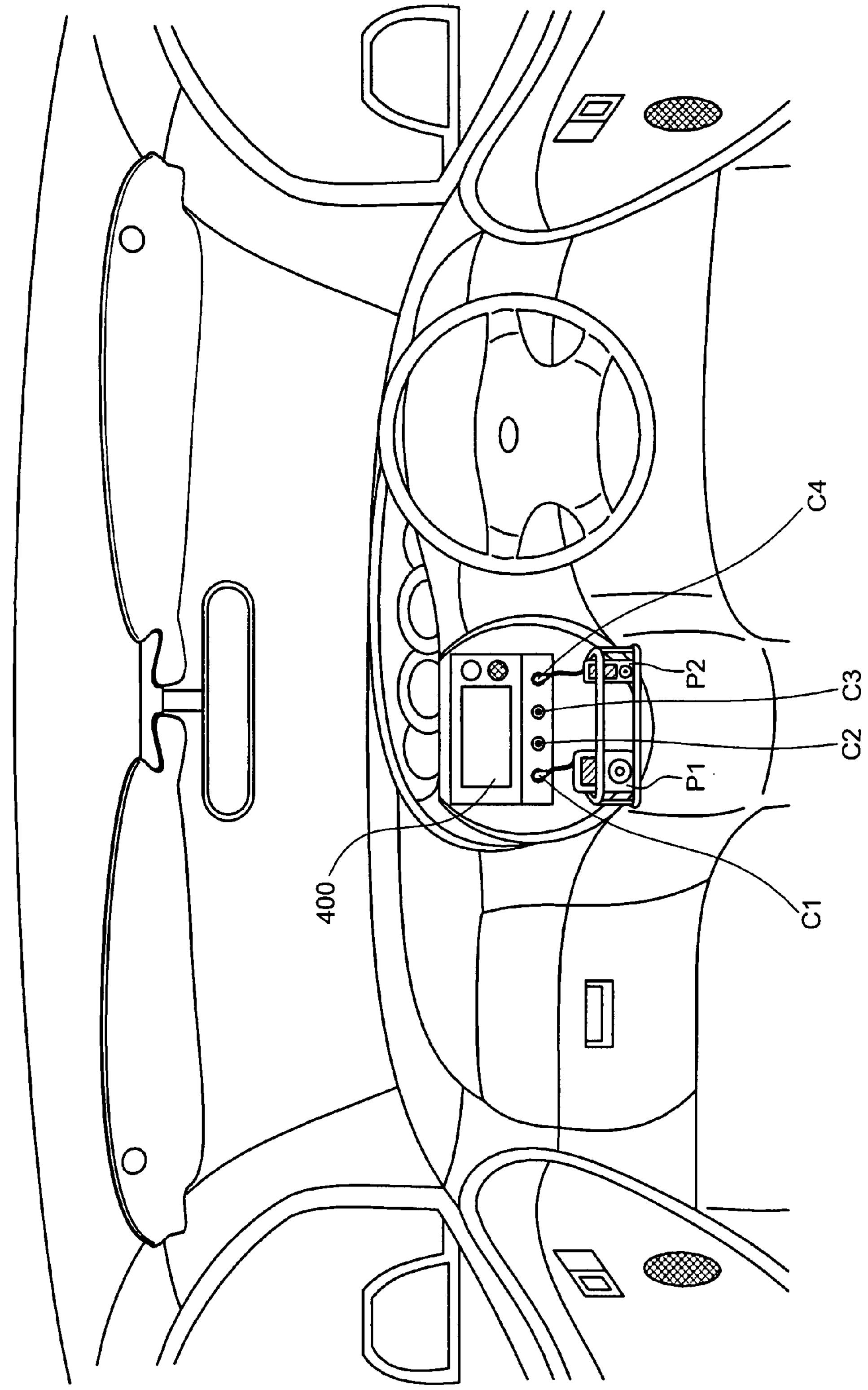
FIG. 4 is an explanatory drawing of a dashboard of a vehicle equipped with the content reproduction controlling apparatus.

FIG. 4 is an explanatory drawing of a dashboard of a vehicle equipped with the content reproduction controlling apparatus. The content reproduction controlling apparatus 400 is installed on a dashboard of a vehicle. The content reproduction controlling apparatus 400 reproduces and outputs music data recorded on a medium, such as a compact disk (CD) or a mini-disk (MD). The content reproduction controlling apparatus 400 reproduces and outputs image data recorded on, for example, a digital versatile disk (DVD). The content reproduction controlling apparatus 400 may include a recording medium, such as a hard disk to reproduce and output content data recorded in the apparatus. The content reproduction controlling apparatus 400 may receive at least one of a radio broadcast and a television broadcast to perform at least one of audio output and display output.

Connectors C (C1 to C4) that are used to connect portable content reproduction terminals P (P1 and P2) are provided in the content reproduction controlling apparatus 400 so that each portable content reproduction terminal P of a user in the vehicle can be connected. The portable content reproduction terminal P has, for example, a small hard disk or a flash memory installed therein, and has content data, such as, music data, graphic data, or video data recorded therein. Each user in the vehicle can individually enjoy content recorded in the portable content reproduction terminal P. Additionally, when the portable content reproduction terminal P is connected to the content reproduction controlling apparatus 400, all users can enjoy content recorded in the portable content reproduction terminal P.

When the portable content reproduction terminal P is connected with the connector C, an interface of the content reproduction controlling apparatus 400 can be used to operate the portable content reproduction terminal P. When the content reproduction controlling apparatus 400 is operated to instruct reproduction of content recorded in the portable content reproduction terminal P, the portable content reproduction terminal P reproduces content data recorded in the apparatus and outputs reproduction data to the content reproduction controlling apparatus 400. The content reproduction controlling apparatus 400 outputs the reproduction data from a speaker 510 or a display 513 described hereinafter.

Content recorded in the portable content reproduction terminal P is reproduced by the portable content reproduction terminal P in the following description, however, reproduction is not restricted thereto. For example, content data of content recorded in the portable content reproduction terminal P may be copied to the content reproduction controlling apparatus 400 so that the content reproduction controlling apparatus 400 can perform reproduction.

Connection between the content reproduction controlling apparatus 400 and each portable content reproduction terminal P may be achieve through a wire (e.g., a cable) as depicted in the drawing, or may be achieved wirelessly. When connection is achieved wirelessly, whether connection with the content reproduction controlling apparatus 400 is allowed may be confirmed with respect to a user of the portable content reproduction controlling device P at the time of achieving of connection.

Figure 5:
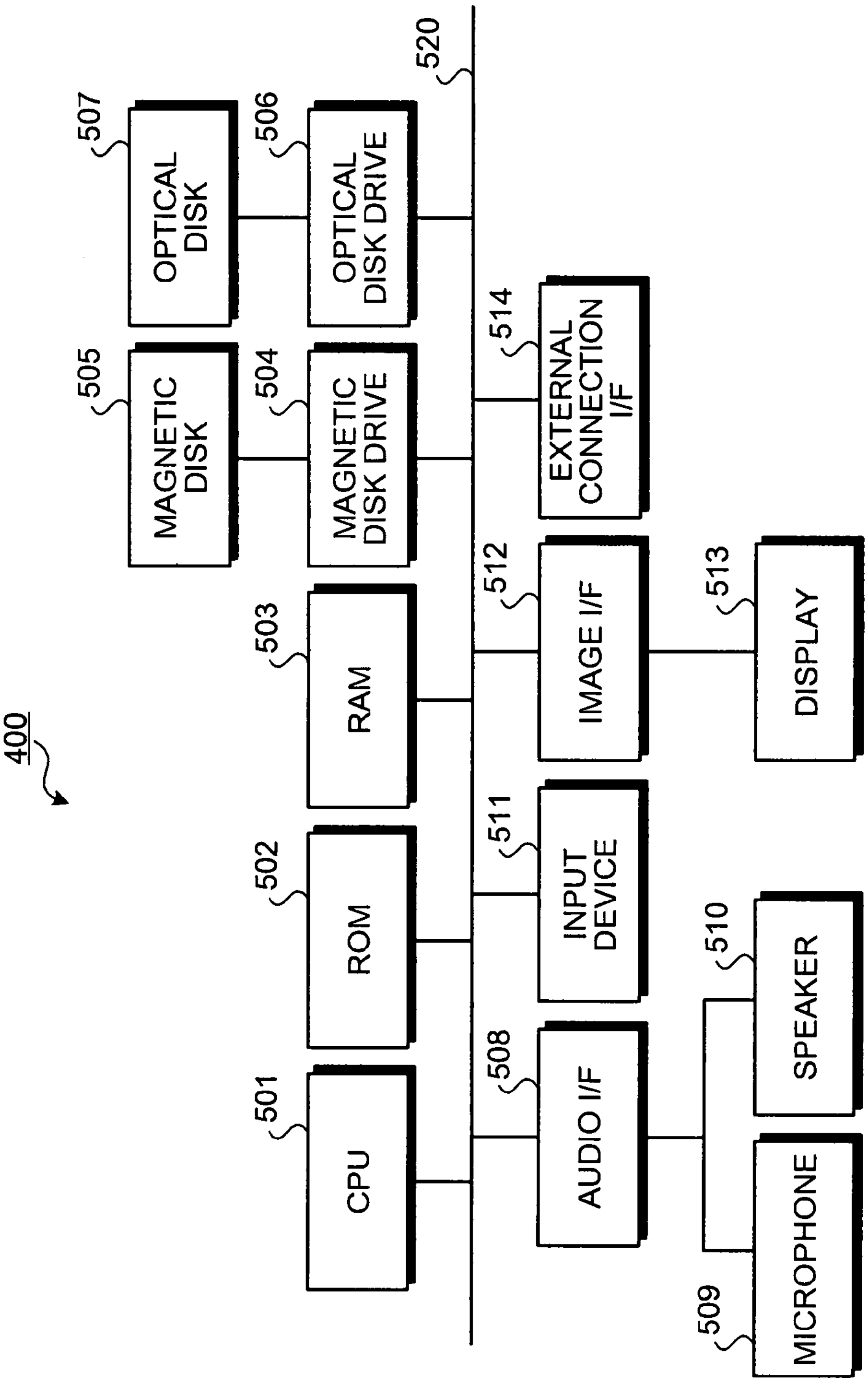
FIG. 5 is a hardware block diagram of the content reproduction controlling apparatus.

FIG. 5 is a block diagram of the content reproduction controlling apparatus. As shown in FIG. 5, the content reproduction controlling apparatus 400 includes a CPU 501, a read-only memory (ROM) 502, an random access memory (RAM) 503, a magnetic disk drive 504, a magnetic disk 505, an optical disk drive 506, an optical disk 507, an audio interface (I/F) 508, a microphone 509, a speaker 510, an input device 511, a image I/F 512, a display 513, and an external connection I/F 514. The respective constituent units 501 to 514 are connected through a bus 520.

The CPU 501 controls the entire content reproduction controlling apparatus 400. The ROM 502 records programs, such as a boot program, a communication program, a music reproducing program, and a data analyzing program. The RAM 503 is used as a work area for the CPU 501.

The magnetic disk drive 504 controls the reading and writing of data with respect to the magnetic disk 505 under the control of the CPU 501. The magnetic disk 505 records therein data written under control of the magnetic disk drive 504. As the magnetic disk 505, for example, a hard disk (HD) or a flexible disk (FD) can be used.

The optical disk drive 506 controls the reading and writing data with respect to the optical disk 507 under control of the CPU 501. The optical disk 507 is a detachable recording medium from which data is read out under the control of the optical disk drive 506. As the optical disk 507, a writable recording medium can be also utilized. As this detachable recording medium, an MO, a memory card, etc. can be used besides the optical disk 507.

As an example of information recorded on the magnetic disk 505 or the optical disk 507, includes content data, such as music data, graphic data, or video data. For example, music data may be compressed based on various kinds of compression formats, such as a moving picture experts group-1 Audio Layer 3 (MP3) format, a Windows media audio (WMA) format, or an advanced audio coding (AAC) format. Content data recorded in the magnetic disk 505 or the optical disk 507 is respectively output from the speaker 510 or the display 513 respectively through the audio I/F 508 or the image I/F 512, hereinafter described.

The audio I/F 508 is connected with the audio input microphone 509 and the audio output speaker 510. Sound received through the microphone 509 is subjected to analog-to-digital (A/D) conversion in the audio I/F 508. The speaker 510 outputs sound. Sound input through the microphone 509 can be recorded on the magnetic disk 505 or the optical disk 507 as audio data.

The input device 511 is, for example, a remote controller, a keyboard, a mouse, or a touch panel including keys to input at least one of characters, numerical figures, and various kinds of commands. Any other information processing terminal, such a digital camera or a mobile phone terminal can be connected with the input device 511 to input and output data as appropriate.

The image I/F 512 is connected with the display 513. Specifically, the image I/F 512 includes, for example, a graphic controller that controls the entire display 513, a buffer memory, such as a video RAM (VRAM), which temporarily records image information that can be immediately displayed, a control integrated circuit (IC) that performs display control over the display 513 based on image data output from the graphic controller, and others.

The display 513 displays various kinds of data, such as an icon, a cursor, a menu, a window, text, or an image. As the display 513, for example, a cathode ray tube (CRT), a thin film transistor (TFT) liquid crystal display, or a plasma display can be adopted.

The external connection I/F 514 is a kind of interface (e.g., the connector C depicted in FIG. 4) that connects the portable content reproduction terminal P or a car navigation device with an external device. Connection between the external connection I/F 514 and an external device may be achieved through a wire, such as a cable, or may be achieved wirelessly. The external connection I/F 514 is formed of, for example, a port for a dedicated connection cable or an infrared communication port.

Of the structures in the content reproduction controlling apparatus 100 and 300 according to the present embodiment, the acquiring unit 101 and 301, the extracting unit 103, the reproduction command transmitting unit 303, the reproduction data receiving unit 304, the content information output unit 105 and 306, and the accepting unit 106 and 307 realize respective functions by using the external connection I/F 514. The function of the determining unit 102 and 302 is realized through the CPU 501. The function of reproducing unit 104 is realized through the CPU 501, the audio I/F 508, and the speaker 510. The function of the reproduction data output unit 305 is realized through the audio I/F 508 and the speaker 510.

(Music Reproduction Processing by Content Reproduction Controlling Apparatus 400)

As explained above, the content reproduction controlling apparatus 400 can be connected with the portable content reproduction terminals P to reproduce content recorded in the portable content reproduction terminals P. Here, when a multiple users are present in a vehicle equipped with the content reproduction controlling apparatus 400, content to be reproduced by the content reproduction controlling apparatus 400 may suit the preferences of more users.

In such a case, the content reproduction controlling apparatus 400 extracts content having a common attribute from the content recorded in the portable content reproduction controlling devices P of the respective users, and determines the extracted content as reproduction content. Content having a common attribute is, for example, content that is completely the same, content pertaining to the same artist, or content in the same category.

Meanwhile, content that reflects the preferences of the user is recorded in the respective terminal. Content beyond the preference of a user can be enjoyed by the user, i.e., content to which the user is not usually exposed. Each user can also learn much about the preferences of other users, thereby promoting friendship between the users.

In such a case, the content reproduction controlling apparatus 400 uses viewing and listening frequency information of the content in each portable content reproduction terminal P to determine content recommended by each user as reproduction content, or displays, for example, a name of content recorded in each portable content reproduction terminal P to accept a request of content from each user.

When the portable content reproduction terminals P are connected to the content reproduction controlling apparatus 400 in this manner, ways of enjoying content in a vehicle can broaden. The reproduction of music data in content recorded in each portable content reproduction terminal P is described hereinafter, however, an image or a video may be reproduced by the same processing.

Figure 6:
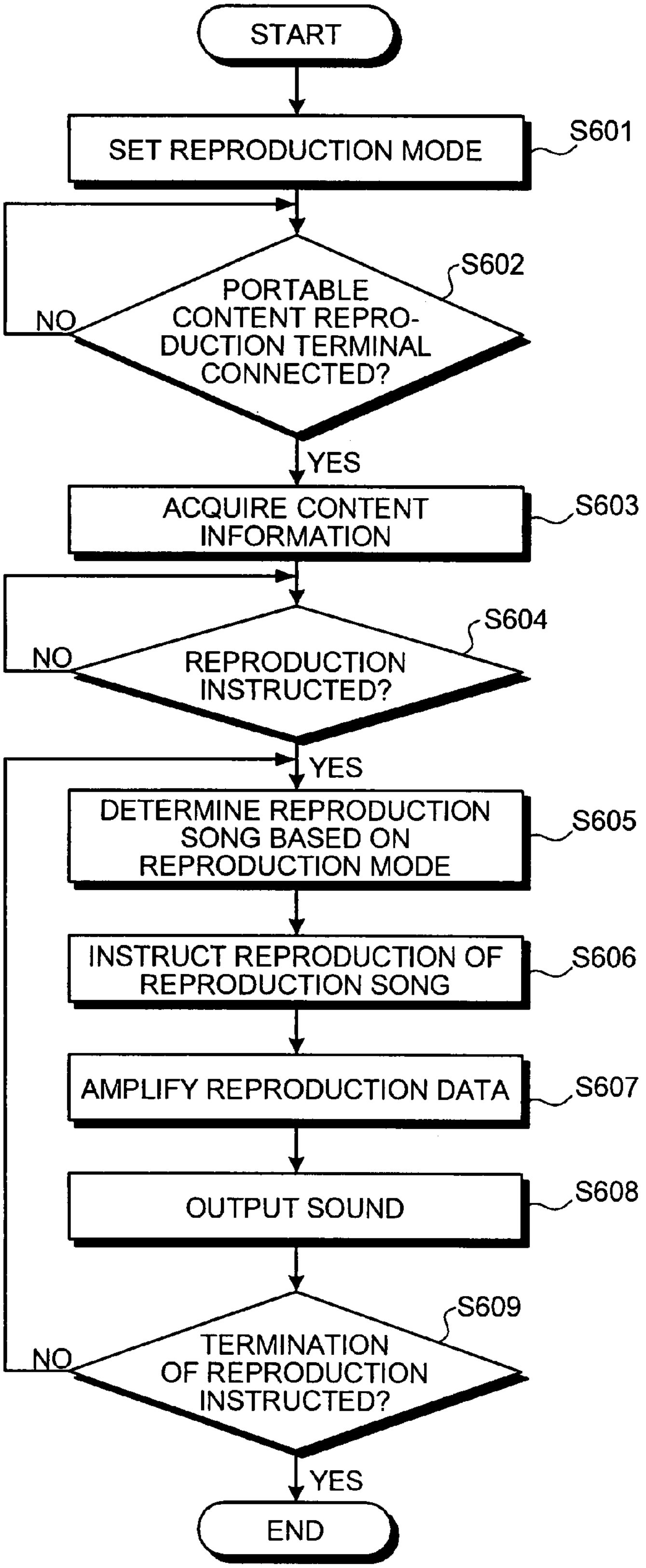
FIG. 6 is a flowchart of music reproduction processing executed by the content reproduction controlling apparatus.

FIG. 6 is a flowchart of music reproduction processing by the content reproduction controlling apparatus. The flowchart shown in FIG. 6 depicts processing when reproducing music recorded in the portable content reproduction terminal P. As shown in the flowchart of FIG. 6, the content reproduction controlling apparatus 400 first accepts the setting of a reproduction mode from a user (step S601). The setting of the reproduction mode can be also accepted during reproduction, etc.

The reproduction modes include for, for example, "a common play mode", "a request mode", and "an all-shuffle mode". The common play mode is a mode of determining content that includes a common attribute among songs recorded in each portable content reproduction terminal P as a reproduction song. The common attribute is, for example, the same song, a song by the same artist, or a song in the same category. Listening frequency information of content in each portable content reproduction terminal P may be used to determine reproduction content. For example, among songs recorded in each portable content reproduction terminal P, a song having the largest listening frequency is determined as reproduction content.

The request mode is a mode of displaying a title of a song or a name of an artist (hereinafter, "content information") recorded in each portable content reproduction terminal P to enable a user to request a song. The content information may be displayed in the display 513 of the content reproduction controlling apparatus 400 or a display unit of each portable content reproduction terminal P. Specification of a song to be requested may be input from the input device 511 in the content reproduction controlling apparatus 400 or from an input unit of each portable content reproduction terminal P.

The all-shuffle mode is a mode of randomly reproducing songs recorded in each portable content reproduction terminal P. A user does not know the next song to be reproduced, and can enjoy an unexpected combination of songs.

The content reproduction controlling apparatus 400 stands by until the portable content reproduction terminal P is connected to the external connection I/F 514 (connector C) (step S602: NO). When the portable content reproduction terminal P is connected (step S602: YES), the content reproduction controlling apparatus 400 acquires content information of a song recorded in the connected portable content reproduction terminal P (step S603). Specifically, the content reproduction controlling apparatus 400 transmits a transmission request signal for the content information to the portable content reproduction terminal P, and receives the content information from the portable content reproduction terminal P that receives the transmission request signal. The content information is acquired for each connected portable content reproduction terminal P.

FIG. 7 is an explanatory drawing of content information acquired by the content reproduction controlling apparatus. As shown in FIG. 7, content information 700 includes a track code 701, song title information 702, artist name information 703, category information 704, release year information 705, listening frequency information 706, and version information 707.

The track code 701 is an identification code required to identify each song in the portable content reproduction terminal P. The song title information 702 is text information indicative of the song title of each song. The artist name information 703 is information indicative of the singer or the performer of each song. The artist name information 703 may include information of a composer or a lyricist. The category information 704 is information indicative of the category of each song, such as "rock", "jazz", and "pop".

The release year information 705 is information indicative of the year when each song is released. The listening frequency information 706 is information indicative of a listening frequency of each song in the portable content reproduction terminal P. The listening frequency indicated by the listening frequency information 706 may be a career listening frequency after song data is recorded in the portable content reproduction terminal P or may be a listening frequency during a predetermined period.

The version information 707 is information indicative of a version of a song recorded in the portable content reproduction terminal P. Musical compositions produced by adding various arrangements to the same song may be released in some cases, and give different impressions to listeners although being the same music, such as a live version obtained by recording a live performance, a remix version produced by adding an arrangement to an existing song, and others with respect to a regular version. The version information 707 is provided to discriminate these versions from each other.

Again referring to the explanation about FIG. 6, the content reproduction controlling apparatus 400 stands by until reproduction of a song is instructed (step S604: NO). Whether reproduction is instructed is judged, for example, based on whether a predetermined operation is executed through the input device 511. When reproduction of a song is instructed (step S604: YES), the content reproduction controlling apparatus 400 determines a song to be reproduced (reproduction song) based on the reproduction mode set at step S601 (step S605). Reproduction processing for a song is described in detail with reference to FIG. 8.

The content reproduction controlling apparatus 400 instructs the portable content reproduction terminal P to reproduce the reproduction song (step S606). The portable content reproduction terminal P reproduces the reproduction song according to the reproduction command, and reproduction data is input to the content reproduction controlling apparatus 400 through the connector C. The content reproduction controlling apparatus 400 amplifies the input reproduction data (step S607), and outputs sound from the speaker 510 (step S608).

The content reproduction controlling apparatus 400 returns to step S605 to continue subsequent processing until termination of reproduction is instructed (step S609: NO). When termination of reproduction is instructed (step S609: YES), the content reproduction controlling apparatus 400 terminates the processing.

Figure 8:
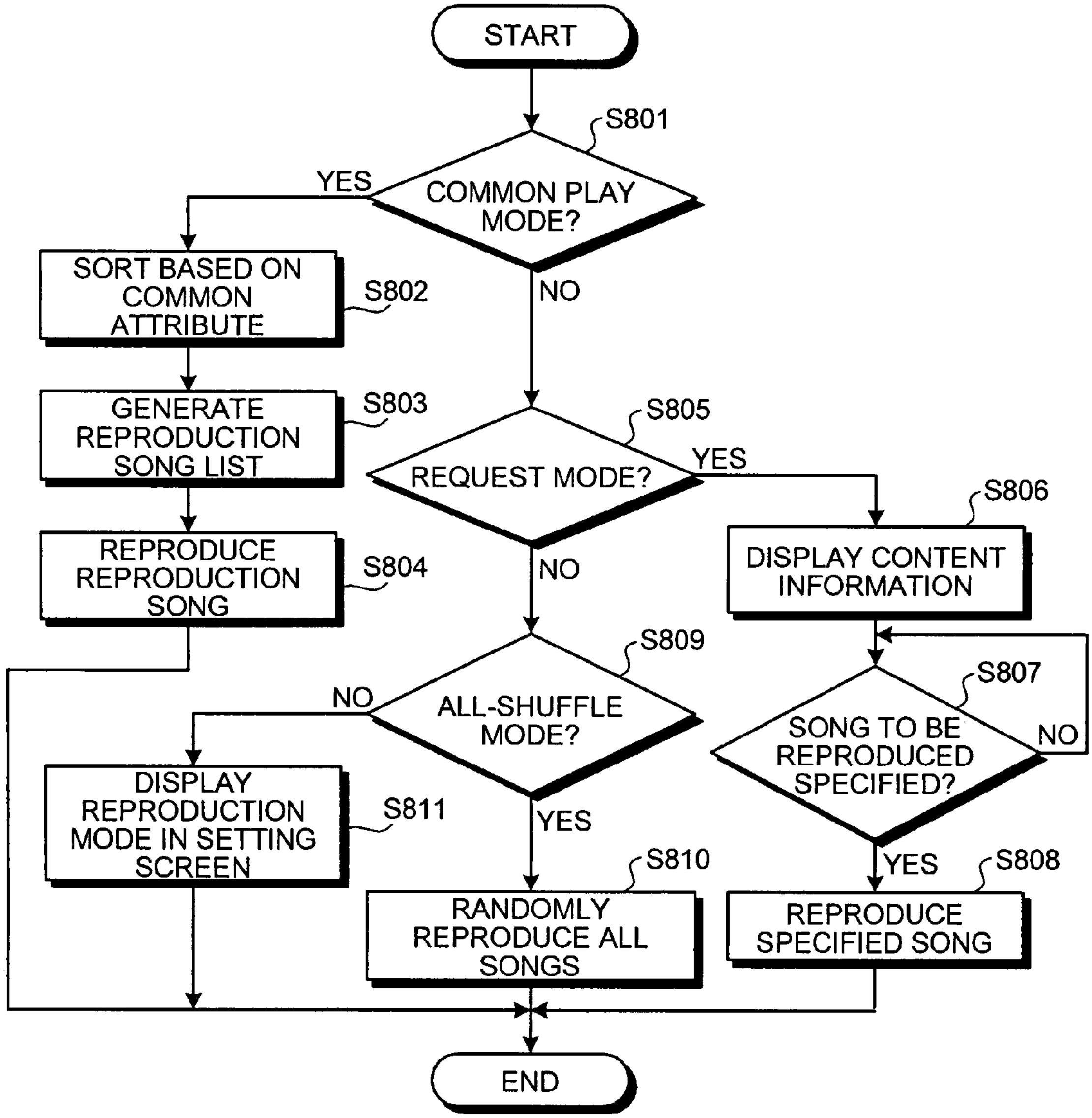
FIG. 8 is a flowchart of reproduction music determination processing executed by the content reproduction controlling apparatus.

FIG. 8 is a flowchart of a procedure of the reproduction song determination processing by the content reproduction controlling apparatus. As shown in the flowchart of FIG. 8, the content reproduction controlling apparatus 400 judges whether the reproduction mode determined at the step S601 in FIG. 6 is the common play mode (step S801).

As explained above, the common play mode is a mode of determining content having common attributes among songs recorded in each portable content reproduction terminal P as a reproduction song. When the reproduction mode is the common play mode (step S801: YES), the content reproduction controlling apparatus 400 sorts songs recorded in each portable content reproduction terminal P based on a common attribute (step S802) to generate a reproduction song list (step S803). Then, the content reproduction controlling apparatus 400 controls the portable content reproduction terminal P according to the reproduction song list, reproduces each reproduction song (step S804), and terminates the processing.

Figure 9:
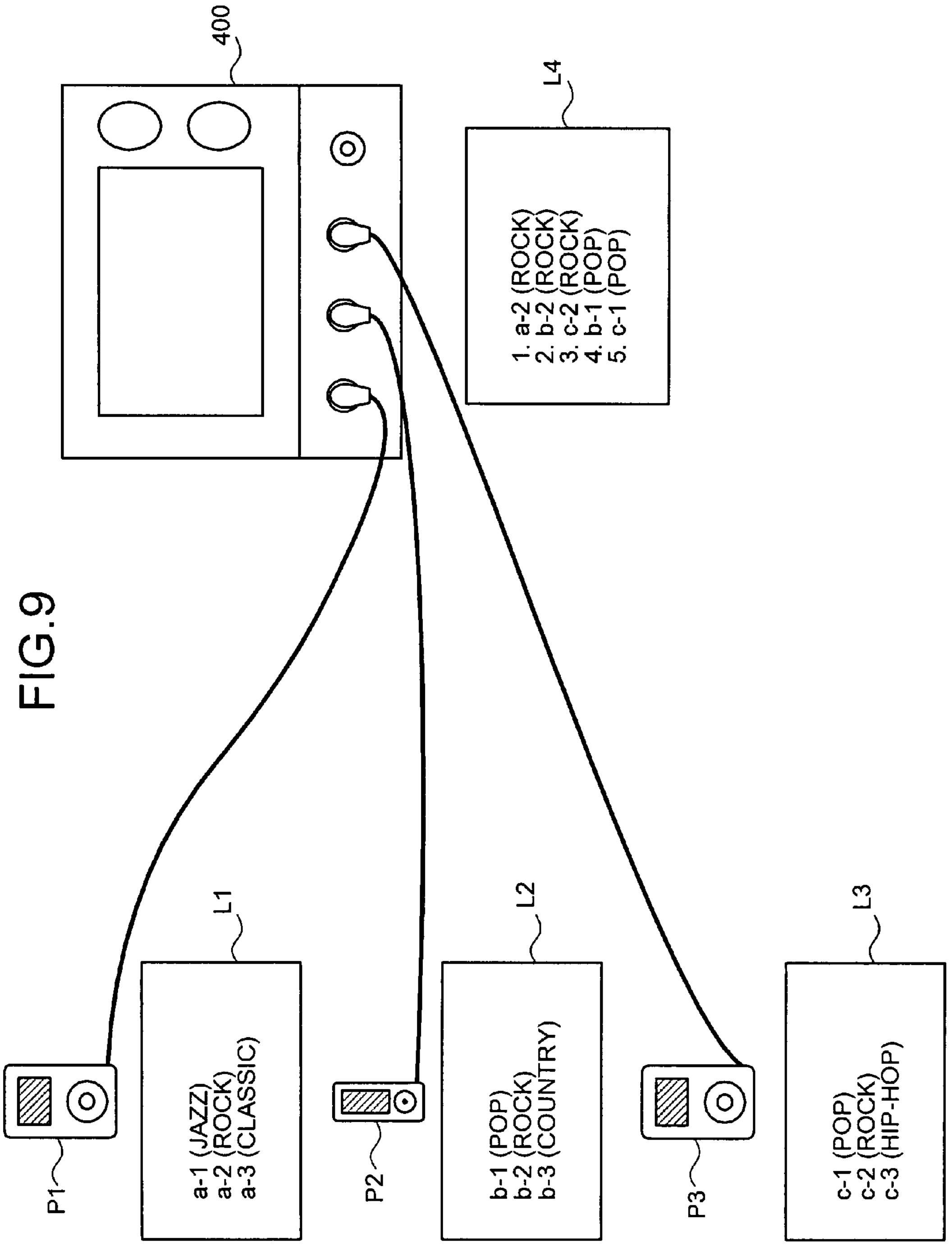
FIG. 9 is an explanatory drawing of the processing at steps S802 and S803 depicted in FIG. 8.

FIG. 9 is an explanatory drawing of processing at steps S802 and S803 shown in FIG. 8. An example where an attribute used for sorting songs is a category of songs is described. As shown in FIG. 9, the portable content reproduction terminals P1 to P3 are connected to the content reproduction controlling apparatus 400. Songs shown in song lists L1 to L3 are recorded in the portable content reproduction terminals P1 to P3, respectively.

Specifically, songs a-1 to a-3 are recorded in the portable content reproduction terminal P1 as shown in the song list L1, and respective categories are "jazz (a-1)", "rock (a-2)", and "classic (a-3)". Songs b-1 to b-3 are recorded in the portable content reproduction terminal P2 as shown in the song list L2, and respective categories are "pop (b-1)", "rock (b-2)", and "country (b-3)". Songs c-1 to c-3 are recorded in the portable content reproduction terminal P3 as shown in the song list L3, and respective categories are "pop (c-1)", "rock (c-2)", and "hip-hop (c-3)".

The content reproduction controlling apparatus 400 first searches the respective portable content reproduction terminals P1 to P3 for a category of songs recorded in common. In the example depicted in FIG. 9, common among the portable content reproduction terminals P1 to P3 are songs in the rock category recorded in each portable content reproduction terminal P1 to P3. Therefore, the content reproduction controlling apparatus 400 determines the songs a-2, b-2, and c-2 of the rock category as reproduction songs.

The content reproduction controlling apparatus 400 also searches the portable content reproduction terminals P1 to P3 for a category having at least a predetermined number of songs. If the predetermined number is, for example, two and greater, the songs belonging to the pop category are recorded in the portable content reproduction terminals P2 and P3. Therefore, the content reproduction controlling apparatus 400 also determines the songs b-1 and c-1 belonging to the pop category as reproduction songs. The content reproduction controlling apparatus 400 generates a reproduction list L4 where these reproduction songs and a reproduction order are registered, and controls the portable content reproduction terminals P according to the reproduction list L4.

An attribute used for sorting songs may be an artist or a release year besides a category of songs. When the same song is recorded in the portable content reproduction terminals P, this song may be determined as a reproduction song. A user may set an attribute used for determining a reproduction song.

A reproduction song may be determined based on an attribute common to songs as well as a listening frequency of each song in each portable content reproduction terminal P. For example, of the songs recorded in the respective portable content reproduction terminals P1 to P3, songs raking first to third in listening frequency are respectively determined as reproduction songs. As a result, a user can be aware of the preferences of other users of the respective portable content reproduction terminals P, and unpredictability of the songs reproduced is also facilitated.

When the reproduction song list is generated, the content reproduction controlling apparatus 400 controls each portable content reproduction terminal P according to the reproduction song list in order to reproduce each reproduction song. When the same song is recorded in more than one of the portable content reproduction terminals P in this example, the portable content reproduction terminal P where song data is recorded at the lowest compression ratio may execute reproduction. If one of the portable content reproduction terminals P has, for example, a different version from a regular version of reproduction song data recorded therein, this portable content reproduction terminal P may execute reproduction.

A navigation device may be connected with the content reproduction controlling apparatus 400 to generate the reproduction song list according to a planned traveling time of the vehicle. For example, if two hours are required to reach a destination, the reproduction song list is generated in such a manner that a total reproduction time of all songs becomes nearly two hours. Songs shown in the reproduction song list may be randomly reproduced.

With reference to FIG. 8, when the reproduction mode is not the common play mode at step S801 (step S801: NO), whether the reproduction mode is the request mode is judged (step S805). As explained above, the request mode is a mode of displaying, for example, a song title or an artist name (hereinafter, "content information") recorded in each portable content reproduction terminal P and allowing a user to request a song.

When the reproduction mode is the request mode (step S805: YES), content information of a song recorded in each portable content reproduction terminal P is displayed (step S806). The content information may be displayed in the display 513 of the content reproduction controlling apparatus 400 or may be displayed in the display unit of each portable content reproduction terminal P. When a rear display is present at a backseat, the content information may be displayed in the rear display.

The content reproduction controlling apparatus 400 stands by until a user specifies a song to be reproduced (step S807: NO). When a song is specified (step S807: YES), the content reproduction controlling apparatus 400 determines the specified song as a reproduction song, controls the portable content reproduction terminal P to reproduce the specified song (step S808), and terminates the processing.

A song may be specified through the input device 511 of the content reproduction controlling apparatus 400, or may be specified through an operating unit of each portable content reproduction terminal P. The number of songs that can be requested by each user may be limited. When a navigation device is connected with the content reproduction controlling apparatus 400, the number of songs that can be requested may be limited according to a planned traveling time of the vehicle. For example, if two hours are required to reach a destination, acceptance of requests is stopped when a total reproduction time of all songs exceeds two hours.

When the reproduction mode is not the request mode (step S805: NO) at step S805, whether the reproduction mode is the all-shuffle mode is judged (step S809). When the reproduction mode is the all-shuffle mode, the mode of randomly reproducing songs recorded in each portable content reproduction terminal P as explained above, (step S809: YES), all songs recorded in each portable content reproduction terminal P are randomly reproduced (step S810), and the processing is terminated.

When the reproduction mode is not the all-shuffle mode (step S809: NO), since no reproduction mode is set, a reproduction mode setting screen is displayed (step S811), and the processing.

The content reproduction controlling apparatus 400 determines each reproduction song according to the reproduction mode to reproduce each reproduction song in the portable content reproduction terminal P based on the above-explained processing. In this example, a connection state of the portable content reproduction terminal P with respect to the content reproduction controlling apparatus 400 or a setting of the reproduction mode may be displayed in the display 513.

Figure 10:
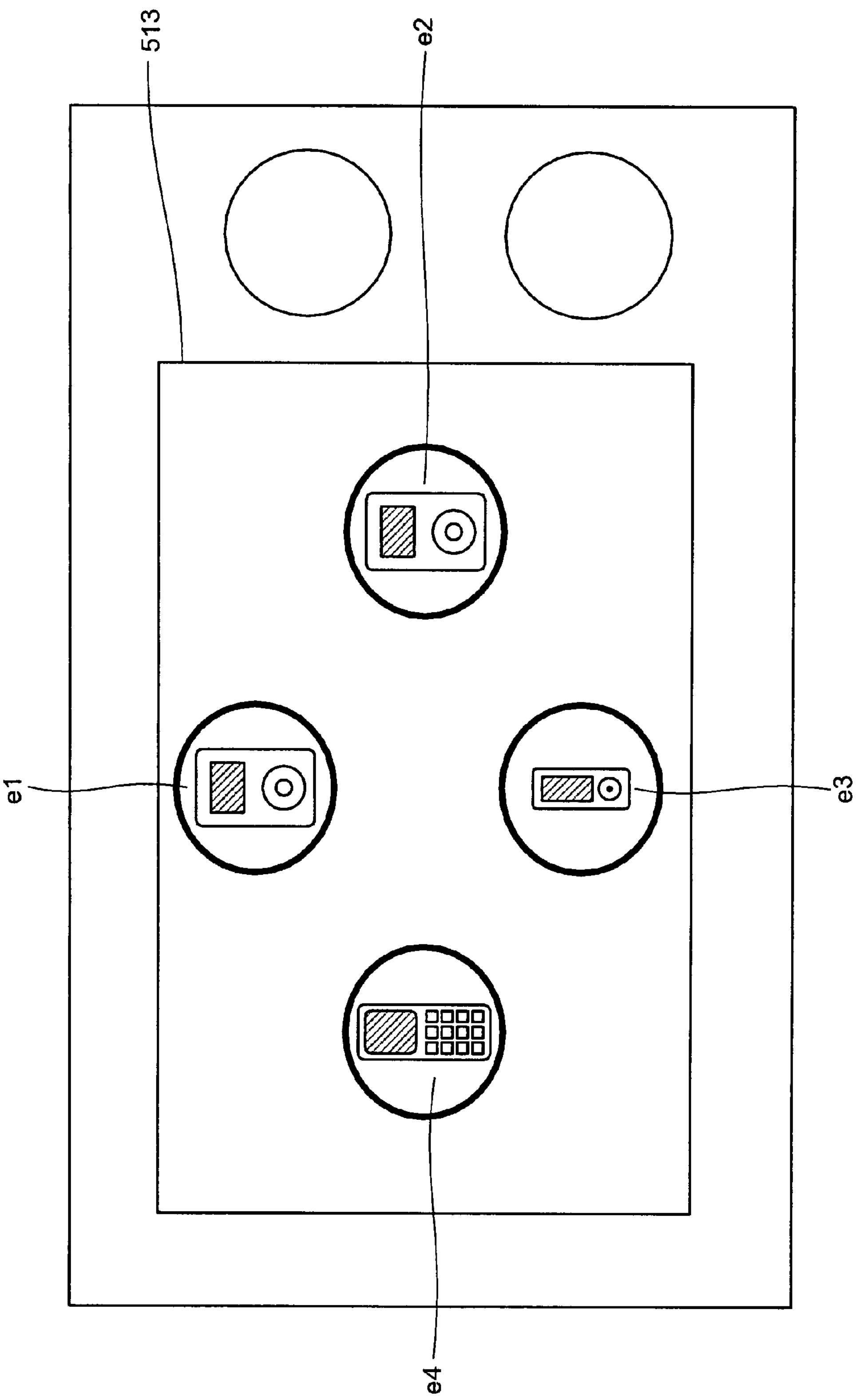
FIG. 10 is an explanatory drawing of a display screen of the content reproduction controlling apparatus.

FIG. 10 is an explanatory drawing of a display screen of the content reproduction controlling apparatus. Terminal indications e (e1 to e4) indicative of the portable content reproduction terminals P connected to the connectors C (C1 to C4) in the content reproduction controlling apparatus 400 are displayed in the display 513 of the content reproduction controlling apparatus 400. For example, when the portable content reproduction terminal P is disconnected from the connector C1, display of the terminal indication e1 is eliminated.

The terminal indication e may specify a model of each connected portable content reproduction terminal P and show a respective imitative appearance. In this case, the content reproduction controlling apparatus 400 acquires model information from each portable content reproduction terminal P at the time of connection with the portable content reproduction terminal P, and selects and displays the corresponding terminal indication e. In this example, when, for example, the portable content reproduction terminals P of the same mode are connected to all the connectors C, a special display screen may be displayed.

When the reproduction mode is, for example, the common play mode, the respective terminal indications e may be simultaneously blinked, or the terminal indication e corresponding to the portable content reproduction terminal P having a currently reproduced song recorded therein may blink. As a result, a user can visually recognize the currently set reproduction mode. In this case, when the reproduction mode is, for example, the request mode, the terminal indication e corresponding to the portable content reproduction terminal P having a requested song recorded therein blinks. When the reproduction mode is the all-shuffle mode, for example, all the terminal indications e randomly blink.

The content reproduction controlling apparatus 400 selects a reproduction song based on content information according to the present embodiment, however, a reproduction order of songs may be determined based on the content information. For example, songs recorded in each portable content reproduction terminal P are ranked based on whether a common attribute is included, and a reproduction order is determined in such a manner that songs having the common attribute are given reproduction priority.

As explained above, according to the content reproduction controlling apparatus 400, reproduction songs are determined based on the content information acquired from the portable content reproduction terminals P. As a result, appropriate songs can be selected from songs recorded in the portable content reproduction terminals P, and then output.

Specifically, the content reproduction controlling apparatus 400 determines each reproduction song based on information common among the content information. As a result, each song having an element common to the respective portable content reproduction terminals P can be reproduced, thereby outputting each song close to the preferences of the users of the respective portable content reproduction terminals P. Specifically, a common song recorded in the respective portable content reproduction terminals P can be output, or a song belonging to a common category recorded in the portable content reproduction terminals P or a song of a common artist recorded in the respective portable content reproduction terminals P can be output.

The content reproduction controlling apparatus 400 determines each reproduction song based on reproduction frequency information of each song in the portable content reproduction terminals P. As a result, a song suitable to a preference of a user of the portable content reproduction terminal P, i.e., a favorite song of a user can be reproduced or output.

The content reproduction controlling apparatus 400 displays content information in the display 513 or outputs the content information to each portable content reproduction terminal P to accept a request of a song from a user. As a result, specification of a song that is recorded in the portable content reproduction terminal of one user can be accepted from any user, thereby outputting the song.

The content reproduction controlling apparatus 400 determines a reproduction order of songs based on content information acquired from each portable content reproduction terminal P. As a result, songs recorded in the portable content reproduction terminals P can be output in an appropriate reproduction order.

The content reproduction controlling method according to the present embodiment can be realized by executing a program on a computer, e.g., a personal computer or a workstation. The program is recorded on a computer-readable recording medium, e.g., a hard disk, a flexible disk, a CD-ROM, an MO, or a DVD, and is read out from the recording medium for execution by the computer. The program may be a transmission medium that can be distributed through a network, such as the Internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire content of Japanese priority document, 2006-187012 filed in Japan on Jul. 6, 2006.

What is claimed is:

1. A content reproduction controlling apparatus connected with a plurality of content reproduction terminal devices, each having a plurality of content items recorded therein, the content reproduction controlling apparatus comprising:

an acquiring unit that acquires, from each of the content reproduction terminal devices, content information indicative of a subject matter of each of the content items;

a determining unit that determines a reproduction content based on the content information, wherein the determining comprises determining whether the content information provided by at least two content reproduction terminal devices is the same, the reproduction content being obtained from the content reproduction terminal devices and being at least one of the content items to be reproduced;

an extracting unit that extracts the reproduction content from the content reproduction terminal devices respectively having the reproduction content recorded therein; and a reproducing unit that reproduces and outputs the extracted reproduction content, wherein it is recorded which content reproduction terminal device is a source of each content item, and wherein the determining unit determines whether files of the content information provided by the at least two content reproduction terminal devices are identical.

2. The content reproduction controlling apparatus according to claim 1, wherein the content information is information concerning a name of each of the content items.

3. The content reproduction controlling apparatus according to claim 1, wherein the content information is information concerning a category of each of the content items.

4. The content reproduction controlling apparatus according to claim 1, wherein the content information is information concerning a performer in each of the content items.

5. The content reproduction controlling apparatus according to claim 1, wherein the determining unit determines the reproduction content based on frequency information that is included in the content information, the frequency information concerning a reproduction frequency in each of the content reproduction terminal devices, of each of the content items.

6. The content reproduction controlling apparatus according to claim 1, further comprising:

a content-information output unit that outputs the content information to at least one of the content reproduction terminal devices; and an accepting unit that accepts designation of a content item from the content reproduction terminal device that receives the content information output from the content-information output unit, wherein the determining unit determines the accepted content item as the reproduction content.

7. The content reproduction controlling apparatus according to claim 1, wherein:

the determining unit further determines a reproduction sequence of the reproduction content;

the extracting unit sequentially extracts the reproduction content according to the reproduction sequence; and the reproducing unit sequentially reproduces and outputs the extracted reproduction content.

8. A content reproduction controlling apparatus connected with a plurality of content reproduction terminal devices, each having a plurality of content items recorded therein, the content reproduction controlling apparatus comprising:

an acquiring unit that acquires, from each of the content reproduction terminal devices, content information indicative of a subject matter of each of the content items;

a determining unit that determines a reproduction content based on the content information, wherein the determining comprises determining whether the content information indicative of the subject matter provided by at least two content reproduction terminal devices is the same, the reproduction content being obtained from the content reproduction terminal devices and being at least one of the content items to be reproduced;

a reproduction-command transmitting unit that transmits, to the content reproduction terminal devices respectively having the reproduction content recorded therein, a command to reproduce the reproduction content;

a reproduction-data receiving unit that receives reproduction data, the reproduction data being the reproduced reproduction content; and a reproduction-data output unit that outputs the received reproduction data, wherein it is recorded which content reproduction terminal device is a source of each content item, and wherein the determining unit determines whether files of the content information provided by the at least two content reproduction terminal devices are identical.

9. The content reproduction controlling apparatus according to claim 8, wherein the content information is information concerning a name of each of the content items.

10. The content reproduction controlling apparatus according to claim 8, wherein the content information is information concerning a category of each of the content items.

11. The content reproduction controlling apparatus according to claim 8, wherein the content information is information concerning a performer in each of the content items.

12. The content reproduction controlling apparatus according to claim 8, wherein the determining unit determines the reproduction content based on frequency information that is included in the content information, the frequency information concerning a reproduction frequency in each of the content reproduction terminal devices, of each of the content items.

13. The content reproduction controlling apparatus according to claim 8, further comprising:

a content-information output unit that outputs the content information to at least one of the content reproduction terminal devices; and an accepting unit that accepts designation of a content item from the content reproduction terminal device that receives the content information output from the content-information output unit, wherein the determining unit determines the accepted content item as the reproduction content.

14. The content reproduction controlling apparatus according to claim 8, wherein the determining unit further determines a reproduction sequence of the reproduction content;

the reproduction-command transmitting unit sequentially transmits the command to reproduce the reproduction content;

the reproduction-data receiving unit sequentially receives the reproduction data; and reproduction-data output unit sequentially outputs the received reproduction data.

15. A content reproduction controlling method of an apparatus connected with a plurality of content reproduction terminal devices, each having a plurality of content items recorded therein, the content reproduction controlling method comprising:

acquiring, from each of the content reproduction terminal devices, content information indicative of a subject matter of each of the content items;

recording which content reproduction terminal device is a source of each content item;

determining a reproduction content based on content information, wherein the determining comprises determining whether the content information provided by at least two content reproduction terminal devices is the same and whether files of the content information provided by the at least two content reproduction terminal devices are identical, the reproduction content being obtained from the content reproduction terminal devices and being at least one of the content items to be reproduced;

extracting the reproduction content from the content reproduction terminal devices respectively having the reproduction content recorded therein;

reproducing the extracted reproduction content; and outputting the extracted reproduction content.

16. The content reproduction controlling method according to claim 15, further comprising:

determining a reproduction sequence of the reproduction content, wherein the extracting includes extracting the reproduction content according to the reproduction sequence, the reproducing includes reproducing the extracted reproduction content according to the reproduction sequence, and the outputting includes outputting the extracted reproduction content according to the reproduction sequence.

17. A content reproduction controlling method of an apparatus connected with a plurality of content reproduction terminal devices, each having a plurality of content items recorded therein, the content reproduction controlling method comprising:

acquiring, from each of the content reproduction terminal devices, content information indicative of a subject matter of each of the content items;

recording which content reproduction terminal device is a source of each content item;

determining a reproduction content based on the content information, wherein the determining comprises determining whether the content information provided by at least two content reproduction terminal devices is the same and whether files of the content information provided by the at least two content reproduction terminal devices are identical, the reproduction content being obtained from the content reproduction terminal devices and being at least one of the content items to be reproduced;

transmitting a reproduction-command to the content reproduction terminal devices respectively having the reproduction content recorded therein to reproduce the reproduction content;

receiving reproduction data, the reproduction data being the reproduced reproduction content; and outputting the received reproduction data.

18. The content reproduction controlling method according to claim 17, further comprising:

determining a reproduction sequence of the reproduction content, wherein the transmitting includes transmitting the reproduction-command according to the reproduction sequence, the receiving includes receiving the reproduction data according to the reproduction sequence, and the outputting includes outputting the received reproduction data according to the reproduction sequence.

19. A non-transitory computer-readable recording medium storing therein a content reproduction controlling program for an apparatus connected with a plurality of content reproduction terminal devices, each having a plurality of content items recorded therein, the content reproduction controlling program causing a computer to execute:

acquiring, from each of the content reproduction terminal devices, content information indicative of a subject matter of each of the content items;

recording which content reproduction terminal device is a source of each content item;

determining a reproduction content based on the content information, wherein the determining comprises determining whether the content information provided by at least two content reproduction terminal devices is the same and whether files of the content information provided by the at least two content reproduction terminal devices are identical, the reproduction content being obtained from the content reproduction terminal devices and being at least one of the content items to be reproduced;

extracting the reproduction content from the content reproduction terminal devices respectively having the reproduction content recorded therein;

reproducing the extracted reproduction content; and outputting the extracted reproduction content.

20. The non-transitory computer-readable recording medium according to claim 19, wherein the computer program further causes the computer to execute:

determining a reproduction sequence of the reproduction content, wherein the extracting includes extracting the reproduction content according to the reproduction sequence, the reproducing includes reproducing the extracted reproduction content according to the reproduction sequence, and the outputting includes outputting the extracted reproduction content according to the reproduction sequence.

21. A non-transitory computer-readable recording medium storing therein a content reproduction controlling program for an apparatus connected with a plurality of content reproduction terminal devices, each having a plurality of content items recorded therein, the content reproduction controlling program causing a computer to execute:

acquiring, from each of the content reproduction terminal devices, content information indicative of a subject matter of each of the content items;

recording which content reproduction terminal device is a source of each content item;

determining a reproduction content based on the content information, wherein the determining comprises determining whether the content information provided by at least two content reproduction terminal devices is the same and whether files of the content information provided by the at least two content reproduction terminal devices are identical, the reproduction content being obtained from the content reproduction terminal devices and being at least one of the content items to be reproduced;

transmitting a reproduction-command to the content reproduction terminal devices respectively having the reproduction content recorded therein to reproduce the reproduction content;

receiving reproduction data, the reproduction data being the reproduced reproduction content; and outputting the received reproduction data.

22. The non-transitory computer-readable recording medium according to claim 21, wherein the computer program further causes the computer to execute:

determining a reproduction sequence of the reproduction content, wherein the transmitting includes transmitting the reproduction-command according to the reproduction sequence, the receiving includes receiving the reproduction data according to the reproduction sequence, and the outputting includes outputting the received reproduction data according to the reproduction sequence.

23. The content reproduction controlling apparatus according to claim 7, wherein the reproduction content that has the content information common to more content reproduction terminal devices is reproduced earlier.

24. The content reproduction controlling apparatus according to claim 14, wherein the reproduction content that has the content information common to more content reproduction terminal devices is reproduced earlier.

25. The content reproduction controlling apparatus according to claim 1, wherein when the reproduction content is recorded in multiple content reproduction terminal devices, the extracting unit extracts the reproduction content from the content reproduction terminal device that stores the reproduction content at the lowest compression ratio.

26. The content reproduction controlling apparatus according to claim 8, wherein when the reproduction content is recorded in multiple content reproduction terminal devices, an extracting unit extracts the reproduction content from the content reproduction terminal device that stores the reproduction content at the lowest compression ratio.

27. A content reproduction controlling apparatus connected with a plurality of content reproduction terminal devices, each having a plurality of content items recorded therein, the content reproduction controlling apparatus comprising:

an acquiring unit that acquires, from each of the content reproduction terminal devices, content information indicative of a subject matter of each of the content items;

a determining unit that determines a reproduction content based on common content information being common to at least two content reproduction terminal devices, the reproduction content being obtained from the content reproduction terminal devices and being at least one of the content items to be reproduced;

an extracting unit that extracts the reproduction content from the content reproduction terminal devices respectively having the reproduction content recorded therein; and a reproducing unit that reproduces and outputs the extracted reproduction content, wherein it is recorded which content reproduction terminal device is a source of each content item, and wherein the determining unit determines whether files of the content information provided by the at least two content reproduction terminal devices are identical.

* * * * *